United States Patent [19]

Hartwig

[11] 4,334,377
[45] Jun. 15, 1982

[54] FISHING POLE HOLDER

[76] Inventor: Edward L. Hartwig, 5636 North Ave., Carmichael, Calif. 95608

[21] Appl. No.: 130,350

[22] Filed: Mar. 14, 1980

[51] Int. Cl.³ .......................................... A01K 85/01
[52] U.S. Cl. .......................................... 43/17; 43/16
[58] Field of Search ...................................... 43/15–17, 43/21.2

[56] References Cited

U.S. PATENT DOCUMENTS

| 2,944,361 | 7/1960 | Coulter | 43/16 |
| 3,284,943 | 11/1966 | Wedel | 43/15 |
| 3,285,360 | 11/1966 | Wetsch | 43/17 |
| 3,832,794 | 9/1974 | Encinias | 43/15 |
| 3,888,034 | 6/1975 | McGuire | 43/17 |
| 4,112,607 | 9/1978 | Scher | 43/17 |

Primary Examiner—Jimmy C. Peters
Assistant Examiner—J. T. Zatarga
Attorney, Agent, or Firm—Blair, Brown & Kreten

[57] ABSTRACT

Provided herein is a fishing pole holder which includes an elongated support member adapted to be disposed in an upstanding position on a supporting surface which has a tubular member for accommodating the handle of the fishing pole. The tubular member is pivotally mounted at one end on the support member for movement in an angular path between a rest position and an operative position by the pulling action of a fish caught on the pole. The tubular member is limited in the amount of pivotal movement by means of the stop element and the system includes a spring, an alarm all of which indicates presence of a fish on the fishing pole.

8 Claims, 3 Drawing Figures

U.S. Patent  Jun. 15, 1982  4,334,377
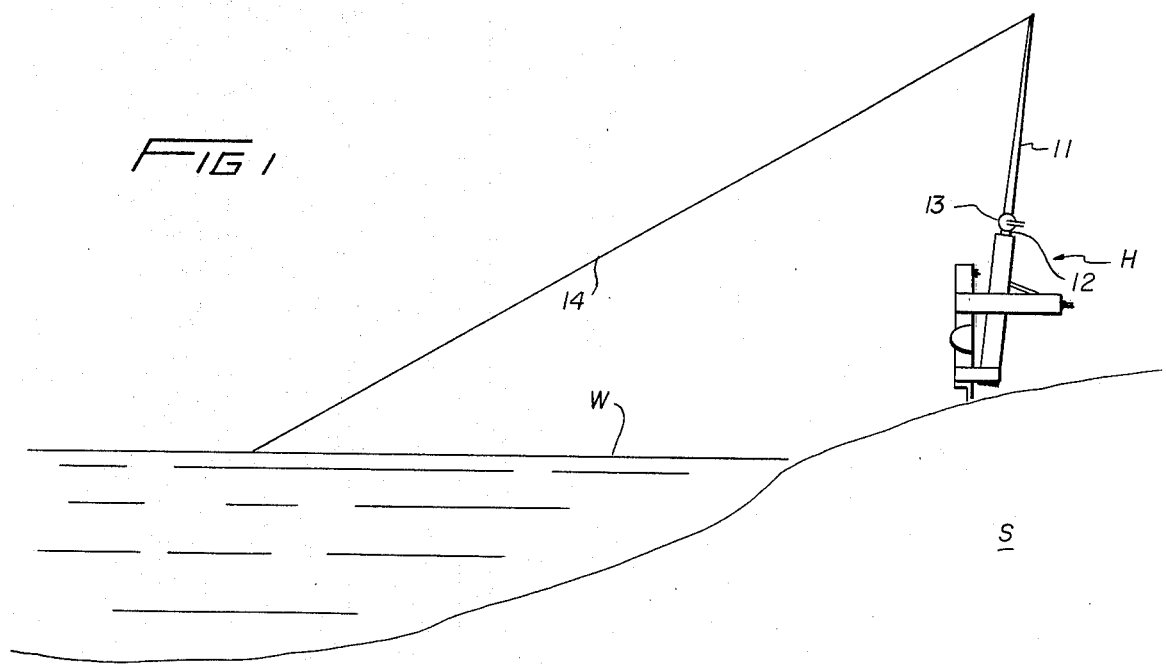
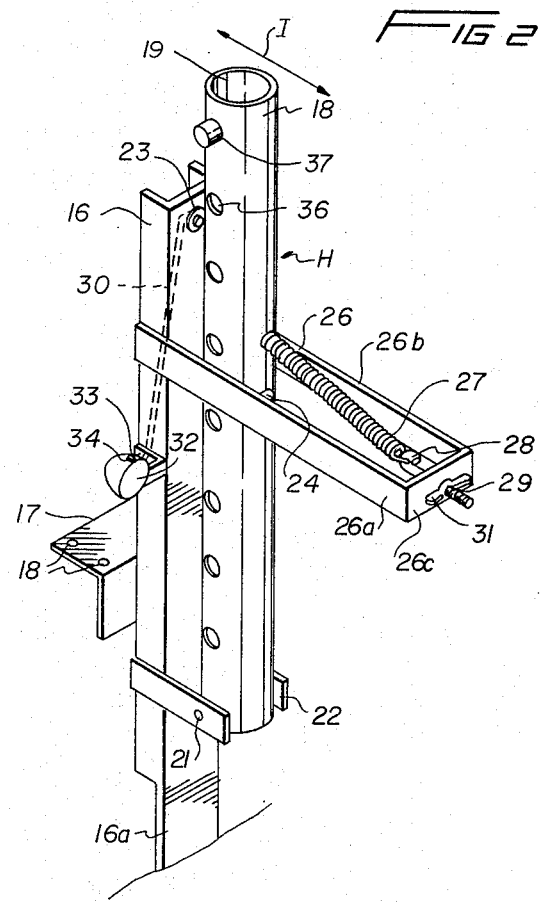
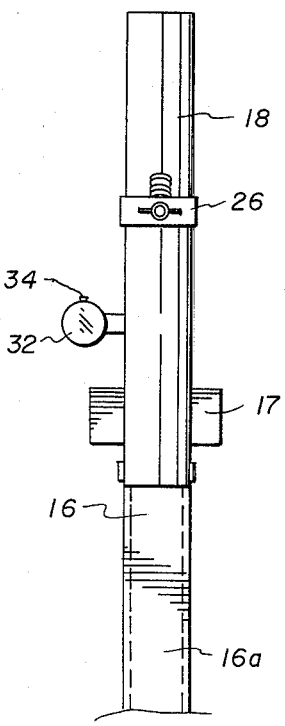

FISHING POLE HOLDER

BACKGROUND OF THE INVENTION

While fisherman generally are an active group, the prolonged intervals of time between bites produces a degree of tedium which frequently annoy the fisherman who seeks relief from such tedium by devices which permit the fisherman to occupy himself otherwise while waiting for a fish to strike. Naturally such fisherman are reluctant to miss the opportunity to catch a fish who may bite on the line during the times when the fisherman is otherwise occupied, so various devices have been proposed which automatically signal a strike on the fishing line while the fisherman is otherwise occupied. In general, such prior art devices comprise a suitable supporting arrangement for the fishing pole and which actuate a suitable alarm by a tilting movement of the pole when the fish bites thereby quickly calling to the attention of the fisherman that a strike has been made. While such prior art devices function generally in a satisfactory manner they are characterized by certain limitations which do not fully satisfy the typical fisherman. In general, such prior art devices are somewhat complex and expensive in construction and lack somewhat the desire degree of sensitivity to the forces exerted by a hooked fish that may vary in size over a wide range. Furthermore with the wide variety of fishing equipment in use today, such present day devices do not readily accommodate some types of fishing equipment which the fisherman may wish to use.

OBJECTS AND SUMMARY OF THE INVENTION

Accordingly, an object of this invention is to provide a new and novel fishing pole holder which automatically indicates the striking of a fish on the line of a fishing pole thereby attracting the attention of the fisherman.

Another object of this invention is to provide a new and novel fishing pole holder for attracting the attention of a fisherman when a fish takes the bait on a line which operates in a positive manner regardless of the size of the fish on the line and which may be easily adjusted for sensitivity so as to operate with any range of fish size to be caught on the fishing pole.

A further object of this invention is to provide a new and novel fishing pole holder for attracting the attention of a fisherman when the bait is taken which is arranged to accommodate a wide variety of sizes of fishing poles which is simple and inexpensive in construction and which is virtually full proof in operation capable of repeated use without breakdown over a prolonged period of time.

A still further object of this invention is to provide a new and novel fishing pole holder for attracting the attention of a fisherman when a fish strikes which is arranged to be mounted on either a supporting surface such as the ground or a structure such as a boat of a like, and which provides both an audible and visual alarm for the inattentive fisherman that a strike has been made.

The objects of this invention and other related objects are accomplished by the provision of an elongated support member which may be driven into the ground or mounted on a boat in an upstanding position and on which a tubular member having a central bore is pivotally mounted for accommodating the handle of a fishing pole. A U-shaped bracket is attached at its free ends to the support member between which the tubular member is arranged to move pivotally in an angular path between a stop position defined by stop means on the bracket and an operative position for engagement with normally inoperative alarm means on the support member thereby indicating the taking of the bait by a fish on the line of the fishing pole supported in the tubular member. A spring is mounted between the bracket and tubular member for urging the tubular member into the stop position and the force of the spring is adjustable in accordance with the size of the fish and its pulling force on the fishing pole contained in the tubular member.

BRIEF DESCRIPTION OF THE DRAWINGS

FIG. 1 is a side view of the fishing pole holder of the invention in an operative position;

FIG. 2 is a perspective view of the fishing pole holer of the invention; and

FIG. 3 is a front view of the fishing pole holder of FIG. 2 invention.

DESCRIPTION OF THE PREFERRED EMBODIMENT

Referring now to the drawing and to FIG. 1 in particular, there is shown a fishing pole holder designated generally by the letter H for use with a fishing pole 11 of conventional construction including a handle 12 and a reel 13 on which is wound a fishing line 14 in the conventional manner. The fishing pole holder H of the invention is arranged to be supported on a surface such as the ground which may be sand S or the like adjacent a body of water W for catching fish by a fisherman who may be occupied in some other activity.

As specifically illustrative of the invention, there is shown in FIG. 2 the fishing pole holder H which includes a support member 16 arranged to be driven into the ground or sand S so as to be disposed in an upstanding manner. The support member 16 may be channel shaped and preferably includes a flat lower portion of 16a to facilitate driving support member 16 into the ground S. Also, the support member 16 is preferably provided with a mounting bracket 17 having a plurality of holes 18 to facilitate mounting the support member 16 in an upstanding position on a boat or the like by means of screws etc.

The fishing pole holder H includes a tubular member 18 having a central bore 19 which is pivotally mounted at one end on the support member 16 by means of a pin 21 and bracket 22 suitably secured by welding or the like to the support member 16. Thus, the tubular member 18 is arranged for pivotal movement on the support member 16 in an arcuate path as indicated by the double arrow I in FIG. 2 and the central bore 19 of the tubular member 18 is arranged to accommodate the handle 12 of the fishing pole 11 in the position shown in FIG. 1.

The tubular member 18 is arranged to be moved pivotally by the pulling action of a fish when caught on the line 14 between an inoperative position as shown in FIGS. 1, 2 and an operative position for engagement with normally inoperative alarm means which include a switch 23 suitably mounted on the support member 16. The inoperative position of the tubular member 18 is established by stop means such as a lug 24 on a U-shaped bracket 26 having leg portions 26a, 26b and a bight portion 26c. The U-shaped bracket 26 is securely attached to the support member 16 in a substantially horizontally extending position by mounting the free ends of the leg portions 26a, 26b to the support member 16 so that the pivotal movement of the tubular member 18 is defined therebetween. The lug 24 defining the inoperative position of the tubular member 18 extends inwardly from the leg portion 26a of the bracket 26 for stopping engagement with the tubular member 18 and means are provided for yieldingly urging the tubular member 18 into the inoperative position of FIG. 2. Most specifically, a spring 27 is connected at one end to the tubular member 18 and at its other end to the bight portion 26c of the bracket 26. In the preferred embodiment, the tension on the spring 27 and therefore the degree of pulling force required to move the tubular member 18 into the operative position is adjustable by means such as a threaded member 28 which extends through an aperture 29 in the bight portion 26c on which a wing nut 31 is mounted. Thus, the threaded engagement between the wing nut 31 and threaded member 28 is adjusted to pull the end of the spring 26 to the right as viewed in FIG. 2 producing the desire degree of tension in the spring.

The switch 23 is connected by suitable conductors 30 to an alarm such as a light 32 preferably detachably mounted by means of a bracket 33 on the support member 16. The light 32 provides a visual alarm and a source of power in the housing of the light 32 is provided which may be a battery or the like (not shown) so that when the tubular member 18 engages the push button switch 23 in the operative position when a fish is caught, a circuit is completed between the light 32 and battery thereby providing a visual indication that a fish has been caught on the line 14.

Also, an audible alarm (not shown) may be provided in the housing of the light 32 which is energized simultaneously with the light 32 by actuation upon the switch 23 thereby providing both a visual and audible alarm for getting the attention of the fisherman. In addition, the light 32 may be provided with a manual switch 34 for connecting the light 32 to the source of power such as the battery when it is desired to illuminate the fishing pole holder H when removing a fish from the hook on the line 14 or for baiting the hook.

Means are provided on the tubular holder 18 for accommodating a fishing pole 11 of a specific length. As fishing poles have handles of varying lengths, the tubular member 18 is provided with vertically spaced pairs of diametrically aligned openings 36 which are arranged to accommodate a pin 37. Thus, when the particular handle length of the fishing pole 11 has been ascertained, the pin 37 is inserted within a selected pair of apertures 36 so that insertion of the handle 12 within the tubular member central bore 19 results in engagement of the bottom of the handle with the pin 37 thereby limiting further penetration of the handle within the tubular member 18 so that the pole 11 is mounted in the tubular member 18 in a selected vertical position.

In the operation of the invention, with the support member 16 suitably disposed in the upstanding position as in FIG. 1, the component parts occupy the position shown therein. Upon a fish striking the line 14 the pulling force exerted by the fish as it attempts to escape moves the fishing pole 11 pivotally in the direction of the left hand arrow of the double arrow I against the urging force of the spring 27 so that the tubular member 18 strikes the pushbutton switch 23. At this time, the battery in the housing of the light 32 is connected to the light 32 and the audible alarm within the light 32 so that the alarm is given to the fisherman who may be occupied elsewhere that a fish is on the line 14. The fisherman then need only retrieve the pole 11 from the tubular member 18 and complete the landing of the fish.

What is claimed is:

1. A fishing pole holder comprising, in combination, an elongated support member adapted to be disposed in an upstanding position on a supporting surface, a tubular member having a central bore for accommodating the handle of a fishing pole, means for pivotally mounting said tubular member at one end on said support member for movement in an angular path between a rest position and an operative position by the pulling action of a fish caught on said fishing pole, a bracket horizontally mounted on said support member, stop means on said bracket for limiting the pivotal movement of said tubular member to said rest position, means on said bracket horizontally disposed for yieldingly urging said holder into said rest position and normally inoperative alarm means on said support member for engagement by said tubular member in said operative position for operatively conditioning said alarm means to indicate the presence of a fish on said fishing pole, wherein said bracket is of U-shaped configuration having a pair of leg portions and a bight portion and including means for attaching the outer ends of said leg portions to said support member with said tubular member therebetween for pivotal movement of said tubular member in said angular path.

2. A fishing pole holder in accordance with claim 1 wherein said urging means comprising a spring, said spring being attached at one end to said bracket bight portion and at the other end to said tubular member.

3. A fishing pole holder in accordance with claim 2 including means on said bracket for adjusting the tension of said spring.

4. A fishing pole holder in accordance with claim 3 wherein said alarm means include a switch on said support member engageable by said tubular member during the pivotal movement of said holder into said operative position, an alarm mounted on said support member and circuit means including said switch for connecting said alarm to an associated source of power.

5. A fishing pole holder in accordance with claim 4 wherein said alarm comprises a visual alarm.

6. A fishing pole holder in accordance with claim 4 including means on said tubular member for limiting the penetration of said fishing pole handle within said tubular member to a selected one of a plurality of vertical positions.

7. A fishing pole holder in accordance with claim 6 wherein said support member includes a substantially flat lower portion for insertion into a supporting surface such as the ground or the like.

8. A fishing pole holder in accordance with claim 7 including a mounting bracket secured to said support member for detachably mounting said support member on a boat or the like.

* * * * *